United States Patent
Hirose (10) Patent No.: US 8,902,058 B2
(45) Date of Patent: Dec. 2, 2014

(54) BRAKE PEDAL SENSOR AND STOP LAMP LIGHTING DEVICE

(71) Applicant: Panasonic Corporation, Osaka (JP)

(72) Inventor: Shinji Hirose, Gifu (JP)

(73) Assignee: Panasonic Corporation, Osaka (JP)

(*) Notice: Subject to any disclaimer, the term of this patent is extended or adjusted under 35 U.S.C. 154(b) by 18 days.

(21) Appl. No.: 13/771,158

(22) Filed: Feb. 20, 2013

(65) Prior Publication Data

US 2013/0222129 A1 Aug. 29, 2013

(30) Foreign Application Priority Data

Feb. 27, 2012 (JP) ................ 2012-039603

(51) Int. Cl.
*B60Q 1/44* (2006.01)
*B60T 7/04* (2006.01)
*B60T 17/22* (2006.01)

(52) U.S. Cl.
CPC ............ *B60Q 1/441* (2013.01); *B60Q 1/447* (2013.01); *B60T 7/042* (2013.01); *B60T 17/22* (2013.01)
USPC ..................................... 340/479; 340/467

(58) Field of Classification Search
CPC ........ B60Q 1/44; B60Q 1/441; B60Q 1/444; B60Q 1/447; B60T 17/22
USPC ...................................... 340/479, 467; 315/77
See application file for complete search history.

(56) References Cited

U.S. PATENT DOCUMENTS

| | | | | | |
|---|---|---|---|---|---|
| 4,871,945 | A | * | 10/1989 | Smith et al. | 315/77 |
| 6,020,814 | A | * | 2/2000 | Robert | 340/467 |
| 7,834,751 | B2 | * | 11/2010 | Tewari | 340/469 |
| 2006/0232396 | A1 | * | 10/2006 | Oasem | 340/479 |
| 2010/0102946 | A1 | * | 4/2010 | Polak et al. | 340/467 |

FOREIGN PATENT DOCUMENTS

JP     2011-225055     11/2011

\* cited by examiner

*Primary Examiner* — John A Tweel, Jr.
(74) *Attorney, Agent, or Firm* — Panasonic Patent Center (57) ABSTRACT

There are provided a brake pedal sensor and a stop lamp lighting device in a vehicle, which are capable of controlling blinking of a stop lamp in a simple configuration. The brake pedal sensor includes: a stop lamp switching section which outputs a switch signal; a brake position sensor section which outputs a brake position signal; and a logic circuit section for receiving the switch signal and a blinking signal generated by the brake position signal are inputted, and which outputs a control signal for controlling lighting and blinking of the stop lamp. Using this brake pedal sensor allows configuration of the stop lamp lighting device in a simpler manner.

20 Claims, 7 Drawing Sheets

| Switch signal Sg11 | Blinking signal Sg13 (input from external terminal 35B) | Control signal Sg14 |
|---|---|---|
| Hi | Hi | Hi |
| Hi | Lo | Hi |
| Lo | Hi | Hi |
| Lo | Lo | Lo |

FIG. 8 PRIOR ART

BRAKE PEDAL SENSOR AND STOP LAMP LIGHTING DEVICE

BACKGROUND OF THE INVENTION

1. Field of the Invention

The field of the invention primarily relates to a brake pedal sensor and a stop lamp lighting device, which detect depressing of a brake pedal in a vehicle and light a stop lamp.

2. Description of the Related Art

In recent years, as vehicles are becoming more sophisticated in functionality, a stop lamp lighting device for detecting abrupt depressing of a brake pedal and blinking a stop lamp is increasingly widespread.

Figure 8:
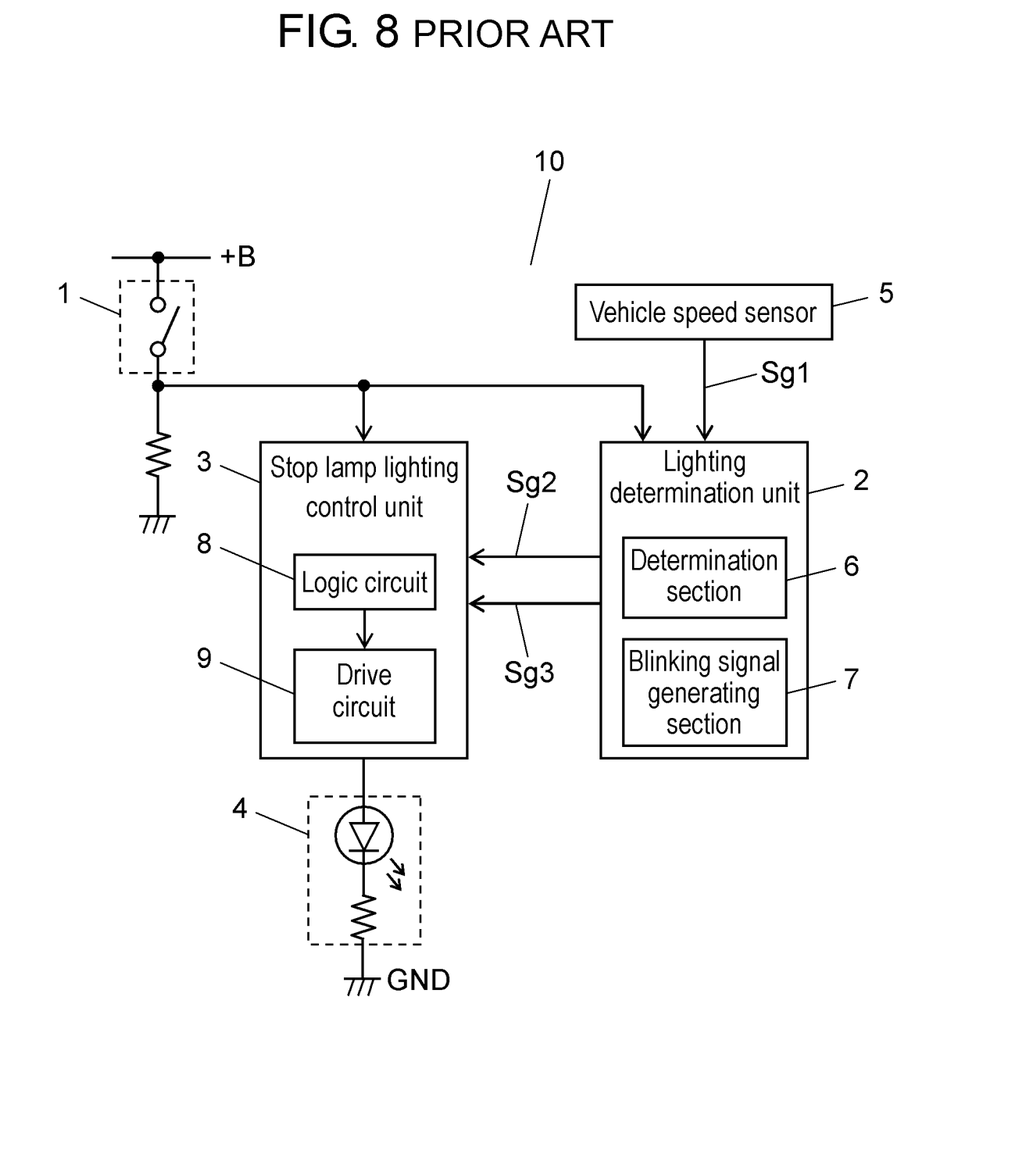
FIG. 8 is a block diagram of a conventional stop lamp lighting device.

FIG. 8 is a block diagram of conventional stop lamp lighting device 10.

Stop lamp lighting device 10 determines to either light or blink stop lamp 4 by judging abrupt depressing of a brake pedal from abrupt reduction in vehicle speed.

Stop lamp lighting device 10 includes stop lamp switch 1, lighting determination unit 2, stop lamp lighting control unit 3, stop lamp 4, and vehicle speed sensor 5.

Lighting determination unit 2 is provided with determination section 6 and blinking signal generating section 7. Vehicle speed signal Sg1 is inputted into determination section 6 from vehicle speed sensor 5, and determination section 6 determines whether the vehicle is reducing speed at a deceleration not lower than a predetermined one. Blinking signal generating section 7 generates blinking signal Sg2 in the case of the vehicle reducing speed at a deceleration not lower than the predetermined one. Lighting determination unit 2 transmits blinking signal Sg2 to stop lamp lighting control unit 3 in the case of the vehicle reducing speed at a deceleration not lower than the predetermined one, and transmits lighting signal Sg3 to stop lamp lighting control unit 3 in the case of the vehicle reducing speed at a deceleration lower than the predetermined one.

Stop lamp lighting control unit 3 is provided with logic circuit 8 and drive circuit 9. Blinking signal Sg2 or lighting signal Sg3 is inputted into logic circuit 8. Logic circuit 8 is connected to stop lamp 4 via drive circuit 9, and blinks stop lamp 4 in the case of blinking signal Sg2 having been inputted, or lights stop lamp 4 in the case of lighting signal Sg3 having been inputted.

As thus described, conventional stop lamp lighting device 10 needs to be provided with lighting determination unit 2, stop lamp lighting control unit 3, and vehicle speed sensor 5 other than stop lamp switch 1 and stop lamp 4.

SUMMARY OF THE INVENTION

However, the above conventional stop lamp lighting device has a large number of component parts, thus causing the problem of mounting those parts taking a long time.

According to a stop lamp lighting device in an exemplary embodiment, the brake pedal sensor includes: a stop lamp switching section which outputs a switch signal; a brake position sensor section which outputs a brake position signal; and a logic circuit section for receiving the switch signal and a blinking signal generated by the brake position signal are inputted, and which outputs a control signal for controlling lighting and blinking of the stop lamp. It is thereby possible to reduce the number of component parts, so as to realize the stop lamp lighting device capable of controlling blinking of the stop lamp in a simple configuration.

DETAILED DESCRIPTION OF THE PREFERRED EMBODIMENT

First Exemplary Embodiment

Figure 1:
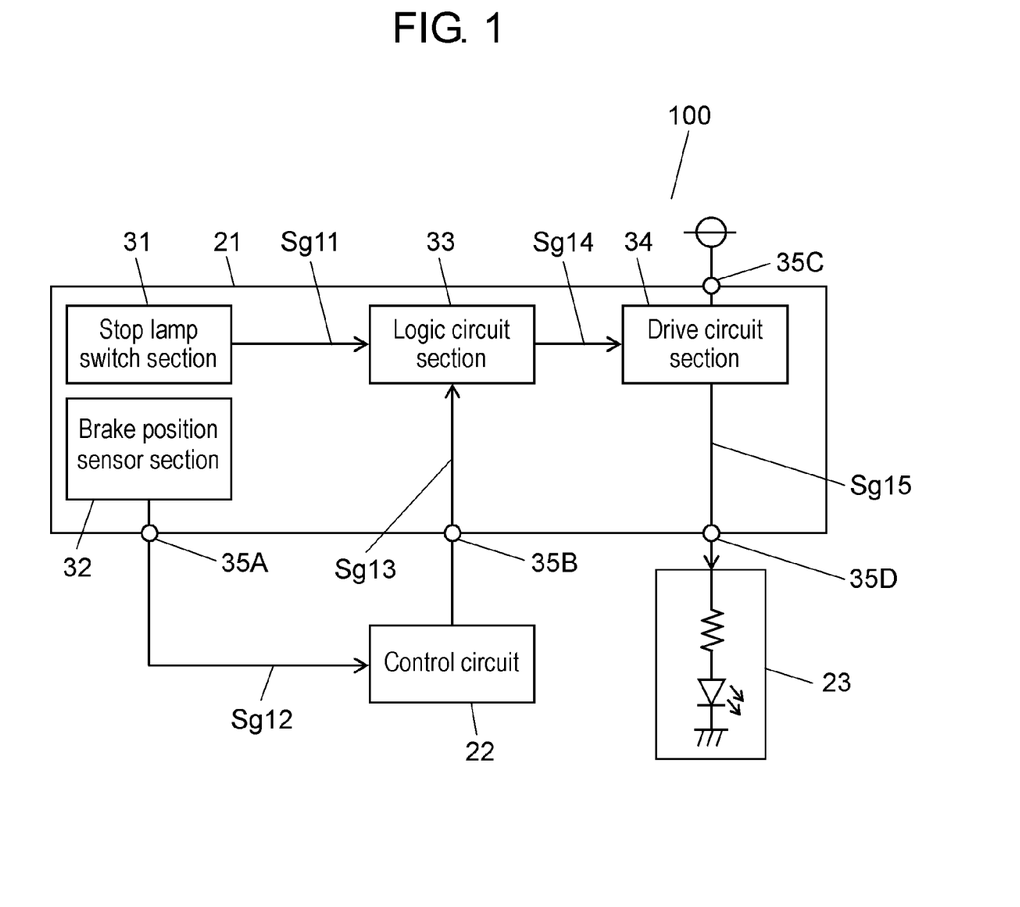
FIG. 1 is a block diagram of a stop lamp lighting device in a first exemplary embodiment of the present invention.

FIG. 1 is a block diagram of a stop lamp lighting device in a first exemplary embodiment of the present invention.

Stop lamp lighting device 100 includes brake pedal sensor 21, control circuit 22, and stop lamp 23.

Brake pedal sensor 21 is provided with stop lamp switch section 31, brake position sensor section 32, logic circuit section 33, drive circuit section 34, and external terminals 35A to 35D.

Stop lamp switch section 31 outputs switch signal Sg11 that changes from Hi to Lo when a brake pedal is depressed.

Brake position sensor section 32 outputs brake position signal Sg12 that changes in accordance with a depressing amount of the brake pedal.

Brake position signal Sg12 is inputted into control circuit 22 via external terminal 35A. Control circuit 22 determines whether or not to output blinking signal Sg13 based on brake position signal Sg12.

Switch signal Sg11 is inputted into logic circuit section 33, and blinking signal Sg13 is inputted thereinto via external terminal 35B. Logic circuit section 33 is configured using an OR circuit or the like. Logic circuit section 33 may be configured of software, or may be configured of hardware. Logic circuit section 33 creates control signal Sg14 based on switch signal Sg11 and blinking signal Sg13, and outputs it to drive circuit section 34.

Drive circuit section 34 is configured of an ON/OFF switchable circuit, such as a transistor. Drive circuit section 34 is connected to a vehicle battery (not illustrated) via external terminal 35C, and connected to stop lamp 23 via external terminal 35D. Control signal Sg14 is inputted into drive circuit section 34, and ON/OFF is switched in synchronization with Lo/Hi of control signal Sg14. In synchronization with Lo/Hi of control signal Sg14, drive circuit section 34 outputs drive signal Sg15 that changes ON/OFF of a current flowing from the vehicle battery to stop lamp 23.

Stop lamp 23 is a lamp disposed on a rear surface of the vehicle with lighting or blinking thereof in a viewable manner. Drive signal Sg15 is inputted into stop lamp 23, which is then lighted/extinguished in synchronization with ON/OFF of drive signal Sg15.

Drive signal Sg15 is successively switched ON/OFF at the time of stop lamp 23 blinking, and drive signal Sg15 is kept ON at the time of stop lamp 23 being lighted, and is kept OFF at the time of the lamp being extinguished.

Although drive signal Sg15 and control signal Sg14 change in synchronization with each other, ON/OFF-change timing of drive signal Sg15 and Lo/Hi-change timing of control signal Sg14 may be in synchronization with each other. It is not necessarily required that control signal Sg14 be Lo at the time of drive signal Sg15 being ON, and that control signal Sg14 be Hi at the time of drive signal Sg15 being OFF. It may be configured such that drive signal Sg15 is ON at the time of control signal Sg14 being Hi.

Next, brake pedal sensor 21 will be described more specifically with reference to FIGS. 2 to 5.

Figure 2:
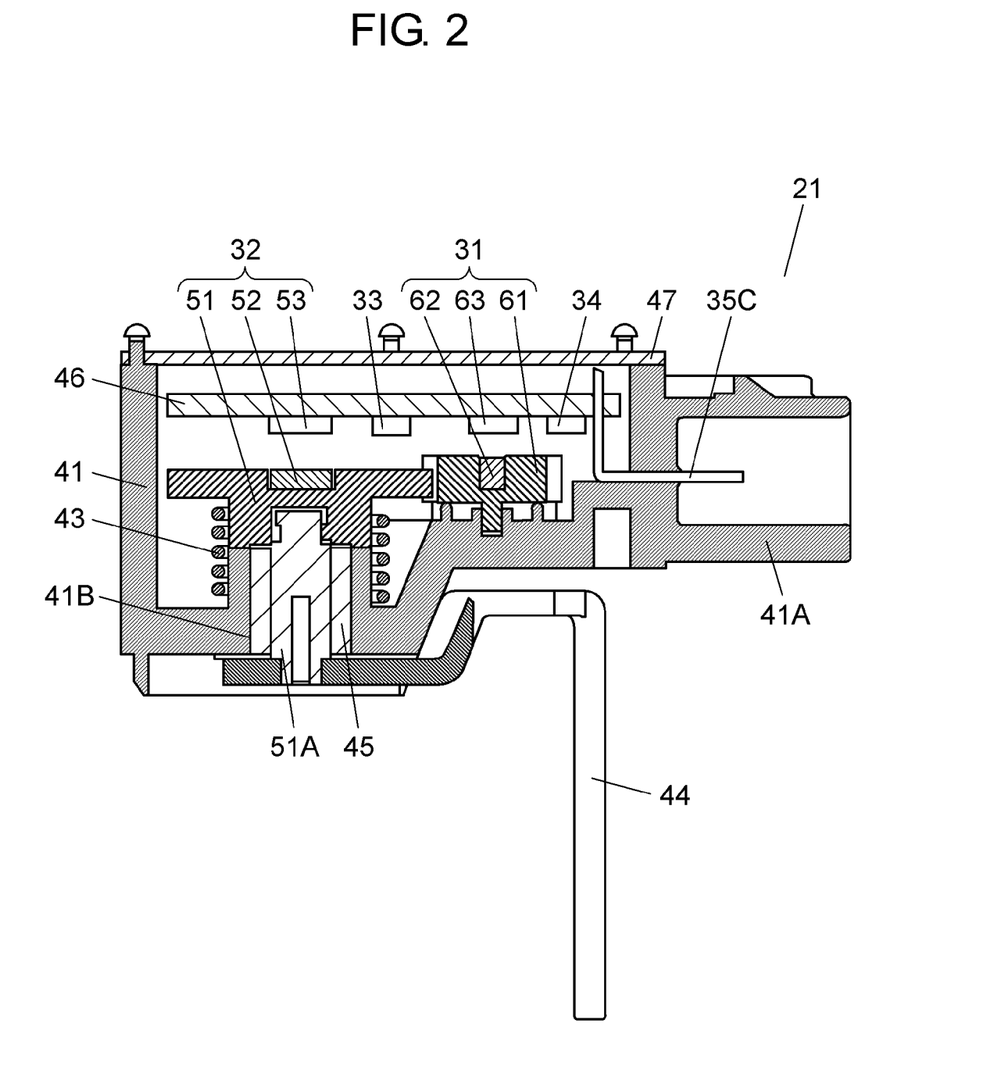
FIG. 2 is a sectional view of a brake pedal sensor for use in the stop lamp lighting device in the first exemplary embodiment of the present invention.
Figure 3:
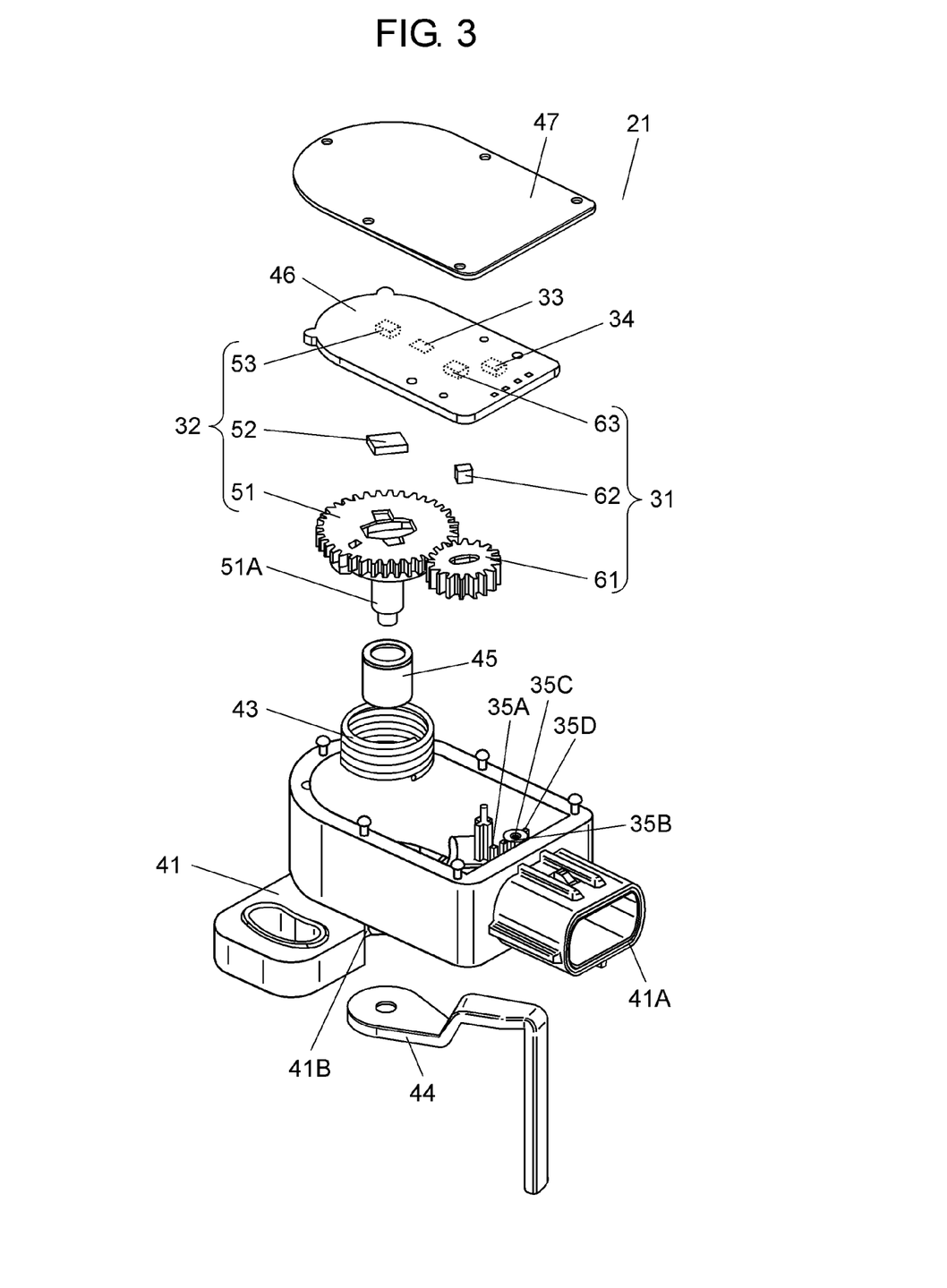
FIG. 3 is an exploded perspective view of the brake pedal sensor for use in the stop lamp lighting device in the first exemplary embodiment of the present invention.

FIG. 2 is a sectional view of brake pedal sensor 21 illustrated in FIG. 1. FIG. 3 is an exploded perspective view of brake pedal sensor 21 in FIG. 2.

Brake pedal sensor 21 is provided with housing 41, spring 43, lever 44, spacer 45, wiring substrate 46, and cover 47, other than stop lamp switch section 31, brake position sensor section 32, logic circuit section 33, drive circuit section 34, and external terminals 35A to 35D.

Brake position sensor section 32 is provided with first rotating body 51, first magnet 52, and first magnetic field detecting element 53. Stop lamp switch section 31 is provided with second rotating body 61, second magnet 62 and second magnetic field detecting element 63.

Housing 41 has a shape of a top-opened square box, and is provided with cylindrical connector section 41A at its right end, and circular hole 41B on its inner bottom. External terminals 35A to 35D are insert-molded in housing 41. One end of each of external terminals 35A to 35D is exposed from the inner wall of housing 41 while the other end is exposed to the inside of connector section 41A.

Spring 43 is configured by winding a metal wire such as a steel wire or a copper alloy wire, and disposed on the inner bottom of housing 41.

First rotating body 51 is a gear provided with teeth at predetermined pitches on its outer edge. Rotating shaft 51A is protruding from an under surface of first rotating body 51, and is inserted in spacer 45 having a cylindrical shape. Spring 43 in a slightly shrunk state is disposed between first rotating body 51 and housing 41, and rotating shaft 51A is inserted into the inside of spring 43. Rotating shaft 51A is inserted in the state of sandwiching spacer 45 between itself and circular hole 41B, and rotating shaft 51A penetrates through the inner bottom surface of housing 41.

Lever 44 is configured by being bent into a substantially L shape. Lever 44 is fixed to an end of rotating shaft 51A. Lever 44 is fixed to the brake pedal so as to be rotated in conjunction with depressing of the brake pedal, and first rotating body 51 is also rotated in association with rotation of lever 44.

Second rotating body 61 is a gear provided with teeth at almost the same pitches as first rotating body 51. First rotating body 51 and second rotating body 61 are rotated with the respective teeth being in engagement and conjunction with each other. Since a diameter of second rotating body 61 is smaller than a diameter of first rotating body 51, the rotation number of second rotating body 61 is larger than the rotation number of first rotating body 51 when first rotating body 51 and second rotating body 61 are rotated in conjunction with each other.

Each of first magnet 52 and second magnet 62 is made of ferrite, a Fe—Cr—Co alloy, a Nd—Fe—B alloy or the like as a material, and has a rectangular parallelepiped shape, a cylindrical shape or the like, and both ends thereof in a direction of the horizontal surface are respectively the south pole and the north pole. First magnet 52 is disposed at a rotational center of first rotating body 51, and second magnet 62 is disposed at a rotational center of second rotating body 61. First magnet 52 and second magnet 62 are rotated in association, respectively, with first rotating body 51 and second rotating body 61.

On an under surface of wiring substrate 46, logic circuit section 33, drive circuit section 34, first magnetic field detecting element 53, and second magnetic field detecting element 63 are disposed. One end of each of external terminals 35A to 35D penetrates through wiring substrate 46.

Logic circuit section 33, drive circuit section 34, first magnetic field detecting element 53, second magnetic field detecting element 63, and external terminals 35A to 35D are connected to one another through wires provided on wiring substrate 46 by etching or the like.

Cover 47 is made of a metal plate or the like as a material, and disposed covering an opened surface of housing 41. Stop lamp switch section 31, brake position sensor section 32, logic circuit section 33, drive circuit section 34, external terminals 35A to 35D, spring 43, spacer 45, and wiring substrate 46 are housed into housing 41.

Next, a configuration of the circuits provided on wiring substrate 46 will be described.

First magnetic field detecting element 53, and second magnetic field detecting element 63, for example, are hole elements, or GMR (Giant Magneto Resistive effect) elements and the like. First magnetic field detecting element 53 and second magnetic field detecting element 63 are disposed confronting respectively first magnet 52 and second magnet 62 with predetermined spaces held therebetween.

With such a configuration, first magnetic field detecting element 53 detects rotation of first rotating body 51, and second magnetic field detecting element 63 detects rotation of second rotating body 61. Then, in response to rotation of lever 44, first magnetic field detecting element 53 outputs brake position signal Sg12, and second magnetic field detecting element 63 outputs switch signal Sg11.

First magnetic field detecting element 53 is connected to external terminal 35A. Second magnetic field detecting element 63 is connected to logic circuit section 33.

That is, first magnetic field detecting element 53 outputs brake position signal Sg12 to the outside of brake pedal sensor 21 via external terminal 35A, and second magnetic field detecting element 63 outputs switch signal Sg11 to logic circuit section 33. Second magnetic field detecting element 63 may include a circuit that converts an analog signal, outputted by the hole element, or the GMR element or the like, to switch signal Sg11 to become a Lo/Hi-digital signal.

Figure 4:
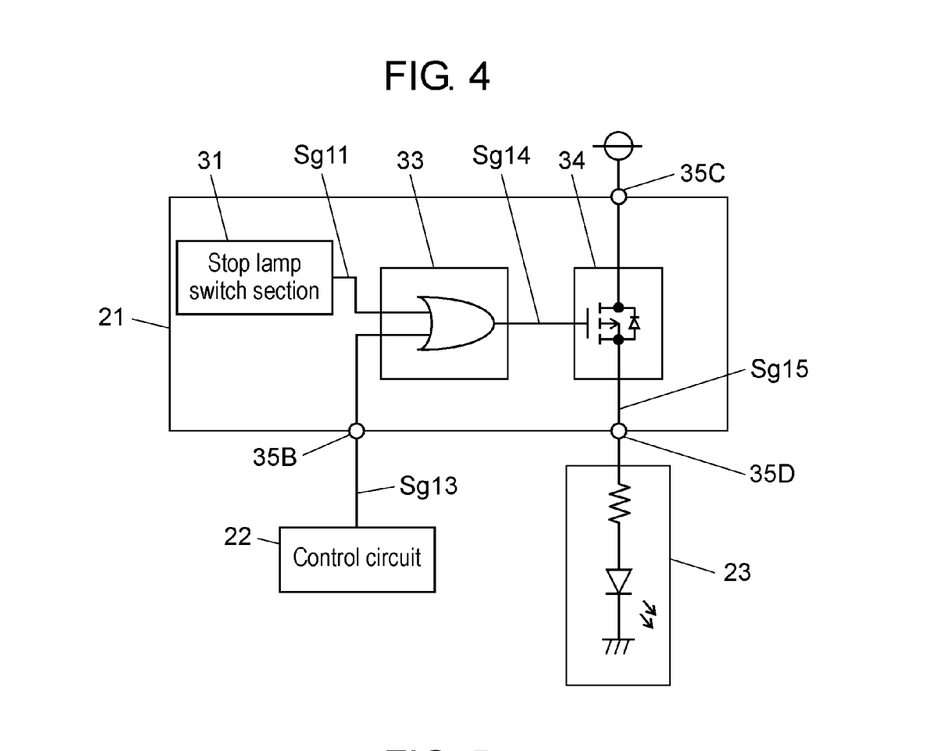
FIG. 4 is a circuit diagram illustrating a configuration of a logic circuit section and a drive circuit section of the stop lamp lighting device in the first exemplary embodiment of the present invention.

Next, with reference to FIG. 4, a specific example of logic circuit section 33 and drive circuit section 34 will be described.

Logic circuit section 33 is configured of an OR circuit as a simple configuration. Logic circuit section 33 is connected to control circuit 22 via external terminal 35B. Logic circuit section 33 is connected to drive circuit section 34.

Switch signal Sg11 is inputted into logic circuit section 33 from stop lamp switch section 31, further, blinking signal Sg13 is inputted into logic circuit section 33 from control circuit 22. Control signal Sg14 is generated based on switch signal Sg11 and blinking signal Sg13, and then outputted.

Switch signal Sg11 is Hi in the case of the brake pedal not being depressed, and is switched to Lo in the case of the brake pedal being depressed. When the brake pedal is abruptly depressed, that is, when a sudden braking operation is performed, blinking signal Sg13 is outputted as a signal of Lo/Hi switched at predetermined time intervals. When blinking signal Sg13 is not inputted, an input of external terminal 35B is Hi.

Control signal Sg14 becomes a Lo-signal at the time of lighting stop lamp 23, and becomes a Hi-signal at the time of extinguishing the lamp, and it becomes repetition of Lo/Hi in the case of blinking the lamp.

Figure 7:
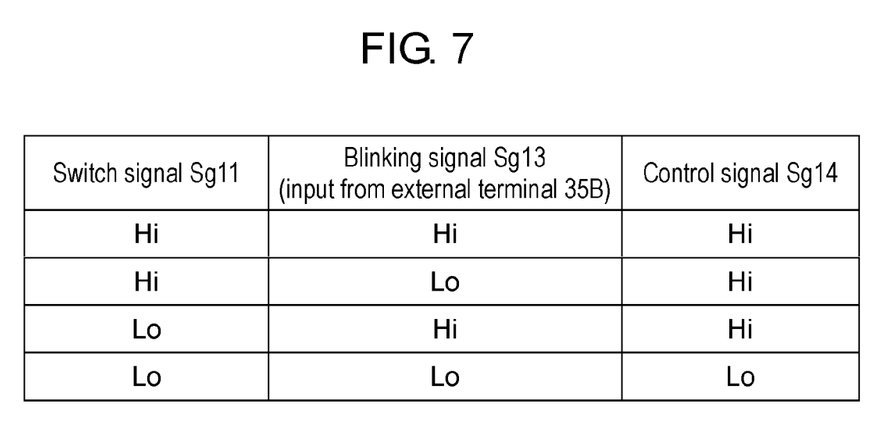
FIG. 7 is a diagram illustrating the relation among a switch signal, the blinking signal and a control signal.

The relation between these signals is summarized in a diagram illustrated in FIG. 7.

Drive circuit section 34 is configured of an ON/OFF switchable element, such as a MOSFET (Metal Oxide Semiconductor Field Effect Transistor).

Control signal Sg14 is inputted into drive circuit section 34. Drive circuit section 34 is connected to external terminals 35C, 35D. External terminal 35C is connected to the vehicle battery, and external terminal 35D is connected to stop lamp 23. When control signal Sg14 is Lo, a current is allowed to flow from the vehicle battery to stop lamp 23 via external terminal 35C and external terminal 35D.

Figure 5:
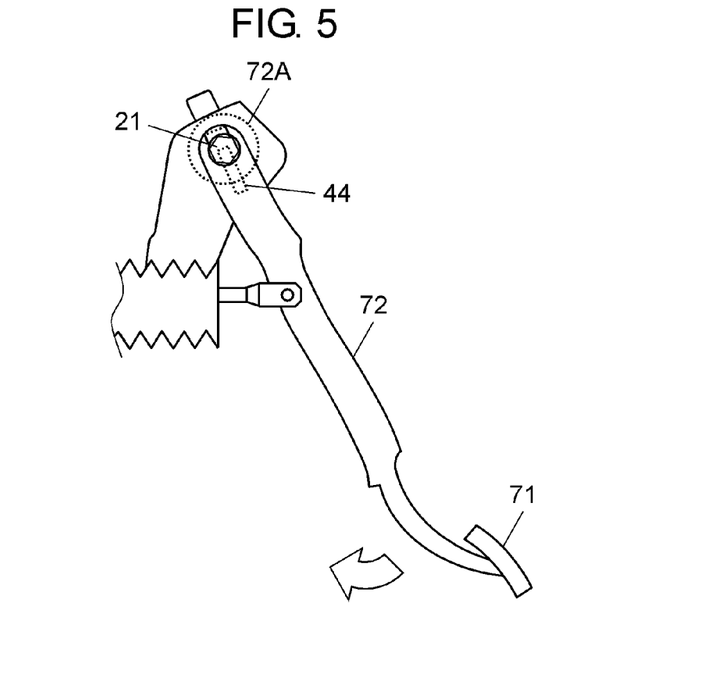
FIG. 5 is a side view illustrating a disposition of the brake pedal sensor for use in the stop lamp lighting device in the first exemplary embodiment of the present invention.

Brake pedal sensor 21 as thus configured is disposed in the vicinity of rotating shaft 72A of arm 72 extending from brake pedal 71, as illustrated in the side view of FIG. 5. Lever 44 is fixed to arm 72, and rotated in accordance with depressing of brake pedal 71 by an operator.

Since stop lamp switch section 31, brake position sensor section 32, logic circuit section 33 and drive circuit section 34 are housed inside one housing 41, brake pedal sensor 21 is suitable for realizing stop lamp lighting device 100 in a simple configuration.

Figure 6:
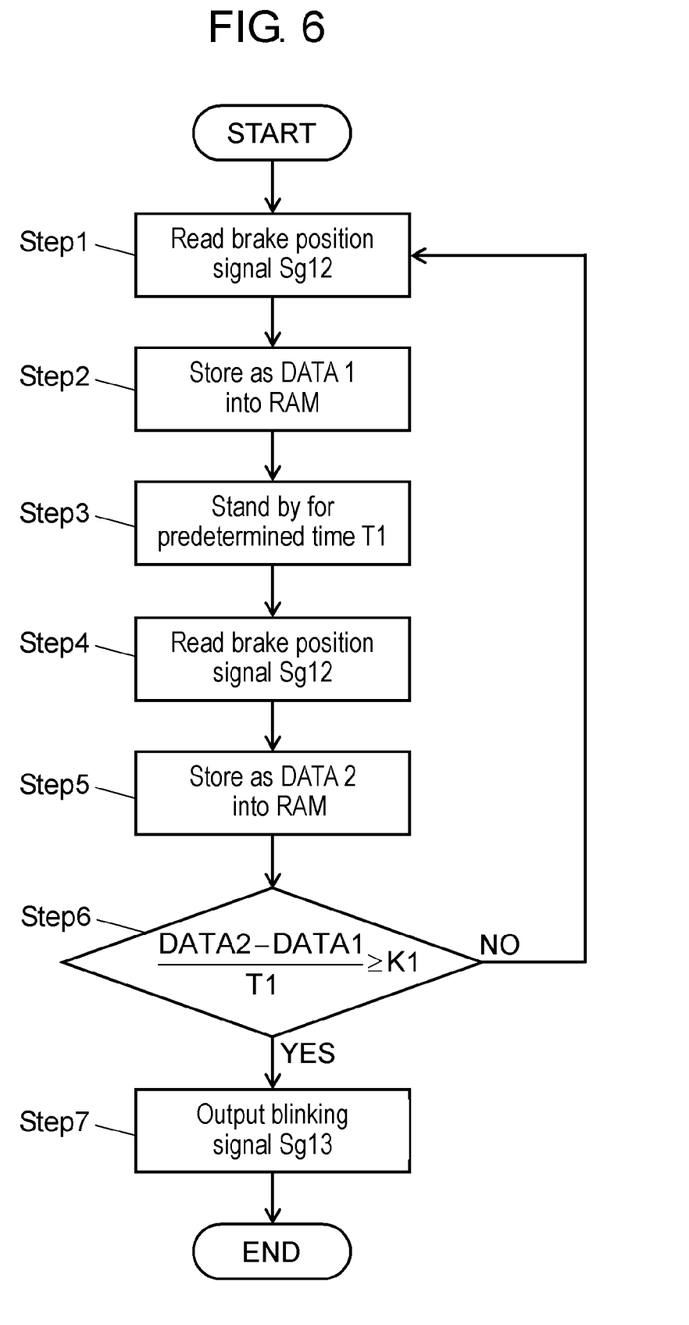
FIG. 6 is a flowchart illustrating a procedure for determining to output a blinking signal, performed by a control circuit for use in the stop lamp lighting device in the first exemplary embodiment of the present invention.

Next, control circuit 22 will be described with reference to FIGS. 1 and 6.

Control circuit 22 is provided with an arithmetic circuit operated by a semiconductor element such as a microcomputer, and storage circuits such as a RAM (Read Available Memory) or a ROM (Read Only Memory). As illustrated in FIG. 1, control circuit 22 is connected to brake pedal sensor 21 via external terminal 35A and external terminal 35B.

An operation of control circuit 22 will be described with reference to the flowchart of FIG. 6.

First, control circuit 22 reads brake position signal Sg12 via external terminal 35A (Step 1), and discriminates a depressing amount of brake pedal 71, to store it as DATA 1 into the RAM or the like (Step 2). Next, after the lapse of predetermined time T1 (Step 3), control circuit 22 reads brake position signal Sg12 again (Step 4), and discriminates a depressing amount of brake pedal 71, to store it as DATA 2 into the RAM or the like (Step 5).

Then, control circuit 22 determines from an amount of change between DATA 2 and DATA 1 as to whether or not a depressing speed of brake pedal 71 is not lower than predetermined value K1 (Step 6). When the depressing speed of brake pedal 71 is not lower than predetermined value K1, control circuit 22 outputs blinking signal Sg13, which can be switched to Lo/Hi at predetermined time intervals, to external terminal 35B (Step 7). When the depressing speed of brake pedal 71 is lower than predetermined value K1, the process is returned to reading of brake position signal Sg12 (Step 1).

In the case of not outputting blinking signal Sg13 from control circuit 22, the output signal to external terminal 35B is Hi.

Control circuit 22 is disposed on the inside of an installation panel of the vehicle, or the like. Control circuit 22 is connected to brake pedal sensor 21 and stop lamp 23 via harnesses, cables, or connectors and the like.

Stop lamp 23 is disposed on the rear surface of the vehicle, and disposed such that its lighting, extinguishing and blinking are visible from a driver of a following vehicle.

In the case of brake pedal 71 not being depressed, switch signal Sg11 is Hi and stop lamp 23 has been extinguished.

Further, switch signal Sg11 becomes Lo by depressing of brake pedal 71. In this case, when the driver has depressed brake pedal 71 at a speed not lower than a predetermined depressing speed, blinking signal Sg13 is outputted and stop lamp 23 blinks. On the other hand, when the driver has depressed brake pedal 71 at a speed lower than the predetermined depressing speed, stop lamp 23 is just lighted, and does not blink.

Brake pedal sensor 21 may be configured not to be provided with drive circuit section 34. For example, stop lamp 23 may be provided with drive circuit section 34.

Control circuit 22 may be integrally disposed with brake pedal sensor 21, not only the case where control circuit 22 is disposed in a different place from brake pedal sensor 21. This enables disposition of stop lamp lighting device 100 in a simpler manner. In that case, control circuit 22 may be disposed on the inside of housing 41.

Further, Rotating body 51 and second rotating body 61 are only rotated in conjunction with each other, the shapes thereof are not restricted. For example, first rotating body 51 and second rotating body 61 may be configured in shapes without having teeth on the peripheries thereof, such as pulleys, and may be connected with a belt or the like to be rotated in conjunction with each other. Either first rotating body 51 or second rotating body 61 may be rotated faster.

As a configuration not to use second magnet 62 and second magnetic field detecting element 63 in stop lamp switch section 31, for example, a semiconductor switch that is turned ON/OFF in accordance with a motion of arm 72 or a mechanical switch may be used. As a configuration not to use first magnet 52 and first magnetic field detecting element 53 in brake position sensor section 32, for example, rotation of arm 72 may be converted to a linear motion by combination with a crank, or a slider or the like and a slide variable resistor or the like may be used, and from an amount of change in electrical characteristic other than the magnetic field, the depressing amount of brake pedal 71 may be detected.

Although control circuit 22 has been described as one that determines the speed of change in depressing amount of brake pedal 71 and outputs blinking signal Sg13, it can also be one that determines acceleration of change in depressing amount of brake pedal 71.

According to the present the first exemplary embodiment, brake pedal sensor 21 is provided with stop lamp switch section 31 which outputs switch signal Sg11, brake position sensor section 32 which outputs brake position signal Sg12, and logic circuit section 33 for receiving switch signal Sg11 and blinking signal Sg13 generated by brake position signal Sg12 are inputted and which outputs control signal Sg14 for controlling lighting and blinking of stop lamp 23. With such a configuration of brake pedal sensor 21, stop lamp lighting device 100 can be configured in a simple manner, so as to be easy to install on the vehicle.

Brake pedal sensor 21 may be provided with drive circuit section 34 for receiving control signal Sg14 is inputted and which outputs drive signal Sg15 for feeding a current to stop lamp 23. This allows configuration of stop lamp lighting device 100 in a simpler manner.

As brake position sensor section 32, there are provided first rotating body 51, first magnet 52 disposed at the rotational center of first rotating body 51, and first magnetic field detecting element 53 disposed confronting first magnet 52. Moreover, as stop lamp switch section 31, there are provided second rotating body 61 rotated in conjunction with first rotating body 51, second magnet 62 disposed at the rotational center of second rotating body 61, and second magnetic field detecting element 63 disposed confronting second magnet 62. This can realize stop lamp switch section 31 with a smaller-sized configuration.

The brake pedal sensor and the stop lamp lighting device according to the exemplary embodiment have an advantageous effect that there can be obtained ones capable of controlling blinking of the stop lamp in a simple configuration, and are useful for being on vehicle.

What is claimed is:

1. A brake pedal sensor comprising:
    a stop lamp switching section which outputs a switch signal whose potential is switched in accordance with depressing of a brake pedal;
    a brake position sensor section which outputs a brake position signal that changes in accordance with a depressing amount of the brake pedal; and
    a logic circuit section for receiving the switch signal and a blinking signal generated based on the brake position signal and supplying a control signal to control lighting and blinking of a stop lamp,
    wherein the brake position sensor section has a first rotating body, a first magnet disposed at a rotational center of the first rotating body, and a first magnetic field detecting element disposed confronting the first magnet.

2. The brake pedal sensor according to claim 1, further comprising
    a drive circuit section for receiving the control signal and supplying a drive signal to feed a current to the stop lamp.

3. The brake pedal sensor according to claim 1,
    wherein the stop lamp switching section has a second rotating body that rotates in conjunction with the first rotating body, a second magnet disposed at a rotational center of the second rotating body, and a second magnetic field detecting element disposed confronting the second magnet.

4. A stop lamp lighting device comprising:
    the brake pedal sensor according to claim 1;
    a control circuit for receiving the brake position signal and determining, based on the brake position signal, whether the brake pedal has been depressed at a speed or an acceleration not lower than a predetermined speed or acceleration before supplying the blinking signal; and
    the stop lamp which lights or blinks in accordance with the control signal.

5. The stop lamp lighting device according to claim 4,
    wherein the brake pedal sensor and the control circuit are integrally provided.

6. A brake pedal sensor comprising:
    a stop lamp switching section which outputs a switch signal whose potential is switched in accordance with depressing of a brake pedal;
    a brake position sensor section which outputs a brake position signal that changes in accordance with a depressing amount of the brake pedal; and
    a logic circuit section for receiving the switch signal and a blinking signal generated based on the brake position signal and supplying a control signal to control lighting and blinking of a stop lamp,
    wherein the stop lamp switching section has a second rotating body that rotates in conjunction with a first rotating body, a second magnet disposed at a rotational center of the second rotating body, and a second magnetic field detecting element disposed confronting the second magnet.

7. The brake pedal sensor according to claim 6, further comprising
    a drive circuit section for receiving the control signal and supplying a drive signal to feed a current to the stop lamp.

8. The brake pedal sensor according to claim 7,
    wherein the brake position sensor section has the first rotating body, a first magnet disposed at a rotational center of the first rotating body, and a first magnetic field detecting element disposed confronting the first magnet.

9. A stop lamp lighting device comprising:
    the brake pedal sensor according to claim 2;
    a control circuit for receiving the brake position signal and determining, based on the brake position signal, whether the brake pedal has been depressed at a speed or an acceleration not lower than a predetermined speed or acceleration before supplying the blinking signal; and
    the stop lamp which lights or blinks in accordance with the control signal.

10. The stop lamp lighting device according to claim 9,
    wherein the brake pedal sensor and the control circuit are integrally provided.

11. A stop lamp lighting device comprising:
    the brake pedal sensor according to claim 3;
    a control circuit for receiving the brake position signal and determining, based on the brake position signal, whether the brake pedal has been depressed at a speed or an acceleration not lower than a predetermined speed or acceleration before supplying the blinking signal; and
    the stop lamp which lights or blinks in accordance with the control signal.

12. The stop lamp lighting device according to claim 11,
    wherein the brake pedal sensor and the control circuit are integrally provided.

13. A stop lamp lighting device comprising:
    the brake pedal sensor according to claim 6;
    a control circuit for receiving the brake position signal and determining, based on the brake position signal, whether the brake pedal has been depressed at a speed or an acceleration not lower than a predetermined speed or acceleration before supplying the blinking signal; and
    the stop lamp which lights or blinks in accordance with the control signal.

14. The stop lamp lighting device according to claim 13,
    wherein the brake pedal sensor and the control circuit are integrally provided.

15. A stop lamp lighting device comprising:
    the brake pedal sensor according to claim 7;
    a control circuit for receiving the brake position signal and determining, based on the brake position signal, whether the brake pedal has been depressed at a speed or an acceleration not lower than a predetermined speed or acceleration before supplying the blinking signal; and
    the stop lamp which lights or blinks in accordance with the control signal.

16. The stop lamp lighting device according to claim 15,
    wherein the brake pedal sensor and the control circuit are integrally provided.

17. A stop lamp lighting device comprising:
    the brake pedal sensor according to claim 8;
    a control circuit for receiving the brake position signal and determining, based on the brake position signal, whether the brake pedal has been depressed at a speed or an acceleration not lower than a predetermined speed or acceleration before supplying the blinking signal; and
    the stop lamp which lights or blinks in accordance with the control signal.

18. The stop lamp lighting device according to claim 17, wherein the brake pedal sensor and the control circuit are integrally provided.

19. A stop lamp lighting device comprising:
a brake pedal sensor including:
a stop lamp switching section which outputs a switch signal whose potential is switched in accordance with depressing of a brake pedal;
a brake position sensor section which outputs a brake position signal that changes in accordance with a depressing amount of the brake pedal; and
a logic circuit section for receiving the switch signal and a blinking signal generated based on the brake position signal and supplying a control signal to control lighting and blinking of a stop lamp;
a control circuit for receiving the brake position signal and determining, based on the brake position signal, whether the brake pedal has been depressed at a speed or an acceleration not lower than a predetermined speed or acceleration before supplying the blinking signal; and
the stop lamp which lights or blinks in accordance with the control signal.

20. The stop lamp lighting device according to claim 19, wherein the brake pedal sensor and the control circuit are integrally provided.

* * * * *